UNITED STATES PATENT OFFICE.

RUDOLF ALBERTI, OF GOSLAR, GERMANY.

PROCESS FOR THE PREPARATION OF LITHOPONES.

No. 854,011.

Specification of Letters Patent.

Patented May 21, 1907.

Application filed November 24, 1905. Serial No. 288,857.

*To all whom it may concern:*

Be it known that I, RUDOLF ALBERTI, a subject of the King of Prussia, residing at Goslar-on-the-Harz, 4 Reussstrasse, in the Kingdom of Prussia, Germany, have invented certain new and useful Improvements Relating to a Process for the Preparation of Lithopones, of which the following is a full, clear, and exact description.

The lithopone prepared by previous methods possesses as is well known the inconvenient property of turning black in sunlight thus greatly limiting the use of this color. It has recently been endeavored to remove this drawback by means of a process described in the specification of Letters Patent No. 17956 of 1903 [Great Britain.] Unfortunately the lithopone thus produced possessed a slightly lesser degree of covering power and received a slightly yellowish color which prevented it from being adopted in a general manner.

The combination which caused the blackness appears according to the above mentioned specification to arise in the incandescent process to which the lithopone is subjected through the presence and the decomposition of combinations of chlorin (chlorid of barium, chlorid of calcium, chlorid of sodium) for which reason great value is attached, in the process hitherto used, to the previous removal of these combinations of chlorin. But it is just these very combinations and the changes caused by them that, as experience has shown, produce the favorable influence on the covering power and color of the product obtained. The blackness itself depends most probably on a reduction in the requisite combination through the sunlight, but the theoretical investigations on this subject have not yet been completed. It was however recognized that the transference of this combination to a higher stage of oxidation, which is no longer reduced by sunlight, must eventually lead to the attainment of the desired result. According to the present invention this has been achieved by the addition of superoxids of alkali and alkaline earths as well as superoxid of hydrogen to the lithopones. The best way is to add the superoxid in question to the ready lithopone— that is to say after it has been submitted to the incandescent process and washed in suitable quantities (when using super-oxid of barium, experience has shown 2% to be sufficient) while it is in the tub or tank and to stir or mix at the ordinary or at a slightly increased temperature. The lithopone thus obtained after pressing and drying remains white in color.

Super-oxid of barium can also be added to the dried lithopone before reduction in the machines used for this purpose, but in such case it is necessary to stir or mix thoroughly.

What I claim as my invention, and desire to secure by patent is:

1. In the preparation of lithopone, the process which consists in adding a superoxid thereto.

2. In the preparation of lithopone, the process which consists in adding a superoxid of an alkaline substance thereto.

3. In the preparation of lithopone, the process which consists in subjecting it to the usual incandescent treatment and subsequently adding a superoxid thereto.

4. In the preparation of lithopone, the process which consists in subjecting it to the usual incandescent treatment, and washing it, and subsequently adding a superoxid thereto.

In witness whereof, I have hereunto signed my name in the presence of two subscribing witnesses.

RUDOLF ALBERTI.

Witnesses:
J. HILDEBRANT,
M. W. EIDENHAMMER.